United States Patent [19]

Gaikema et al.

[11] Patent Number: 4,689,936
[45] Date of Patent: Sep. 1, 1987

[54] PROCESS FOR THE PACKAGING OF PRODUCTS, USING A HEAT TREATMENT, AND CLOSED CONTAINER WITH PACKED PRODUCTS, OBTAINED USING A HEAT TREATMENT

[75] Inventors: Gjalt M. Gaikema, Dedemsvaart; Dirk Zylstra, Bathmen, both of Netherlands

[73] Assignee: Wavin B.V., Netherlands

[21] Appl. No.: 894,507

[22] Filed: Aug. 6, 1986

Related U.S. Application Data

[63] Continuation of Ser. No. 698,440, Feb. 5, 1985, abandoned.

[30] Foreign Application Priority Data

Feb. 6, 1984 [NL] Netherlands ............... 8400366

[51] Int. Cl.$^4$ ................... B65B 63/08; B65B 55/14
[52] U.S. Cl. ..................... 53/440; 53/425; 53/478; 53/488; 53/432
[58] Field of Search ............... 53/129, 167, 320, 404, 53/424, 425, 440, 478, 488, 489, 432; 206/439, 484, 484.1

[56] References Cited

U.S. PATENT DOCUMENTS

| 2,092,445 | 9/1937 | Doulgheridis | 53/404 X |
| 2,179,676 | 11/1939 | Vogt | 99/108 |
| 2,380,811 | 7/1945 | Walker | 53/404 X |
| 2,997,397 | 8/1961 | Doulgheridis | 53/425 X |
| 3,435,948 | 4/1969 | Kaganov et al. | 206/56 |
| 3,989,853 | 11/1976 | Forkner | 53/440 X |
| 4,022,324 | 5/1977 | Schuster | 53/425 X |
| 4,203,019 | 5/1980 | Richter et al. | 53/489 X |

FOREIGN PATENT DOCUMENTS

| 2856544 | 7/1980 | Fed. Rep. of Germany | 53/440 |
| 3287 | of 1903 | United Kingdom | 53/404 |
| 279227 | 10/1927 | United Kingdom | 53/404 |
| 393268 | 5/1933 | United Kingdom | 53/404 |

Primary Examiner—Robert L. Spruill
Assistant Examiner—Steven P. Weihrouch
Attorney, Agent, or Firm—Wigman & Cohen

[57] ABSTRACT

A container or package filled with perishable food materials is closed by a cover presenting a vent hole and the assembly is subjected to sterilization or pasteurization. Thereafter the vent hole is closed by means of a hot melt having a melting point lower than the highest temperature during sterilization or pasteurization. Preferably the hot melt is applied before sterilization or pasteurization and provided with a perforation joining the vent hole. The hot melt may contain a rounded rigid body not melting at the highest sterilization or pasteurization temperature and being able to seal the vent hole, such as a glass bead.

After cooling the closed container is under a subatmospheric pressure.

The container may be of plastics or glass and the cover may be of plastics or plastic coated metal foil, in such a case the plastic coating has a melting point being higher than the melting point of the hot melt.

8 Claims, 4 Drawing Figures

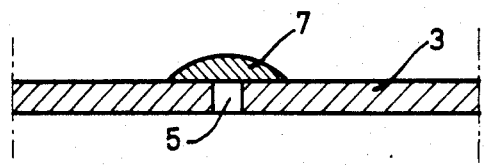
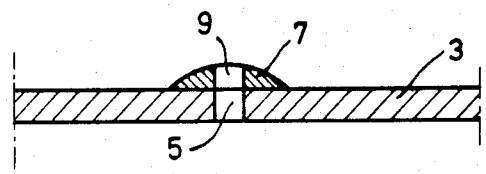
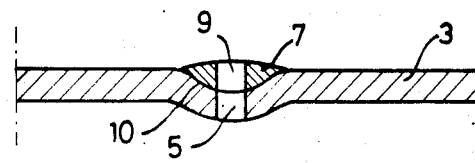
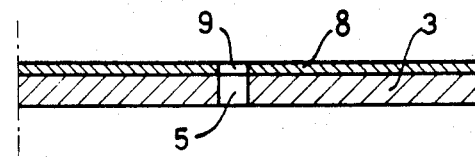
FIG: 3.
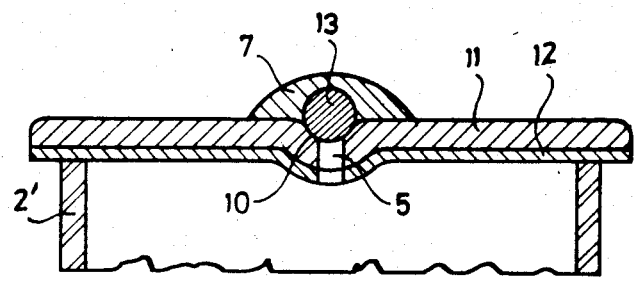
FIG: 4.

PROCESS FOR THE PACKAGING OF PRODUCTS, USING A HEAT TREATMENT, AND CLOSED CONTAINER WITH PACKED PRODUCTS, OBTAINED USING A HEAT TREATMENT

This is a continuation of copending application Ser. No. 698,440 filed Feb 5, 1985 abandoned.

BACKGROUND OF THE INVENTION

The invention relates to a process of packaging products, particularly foods and a closed container with packed products, particularly foods, which container with packed products has been subjected to a heat treatment after packaging.

Such a process and closed container are known in the art. The heat treatment, which consists, for example of pasteurising or sterilising, is to give a longer shelf life to perishable foods.

In the heat treatment of foods in a sealed package or container the pressure will, however, in general rise in the package so that the package may be damaged.

In order to prevent this, the package or container is usually made of pressure-resistant material, which is resistant to pressure increases, for example metal glass or a thick-walled plastic, or provision is made in the package or container for expansion features which absorb the pressure increase. However, this unfortunately leads to relatively expensive packages or containers.

Damage to the package or container is also avoided by increasing the pressure on the outerside of the package or container during the heat treatment, but this possibility is applicable only in a limited number of cases and, besides, it requires special features.

SUMMARY OF THE INVENTION

It is a main object of the invention to provide a process for the packaging of products which are subjected to a heat treatment in a sealed package or container without any of the abovementioned disadvantages.

This object is achieved by a process of packaging products, particularly foods, wherein a container is filled with a specific quantity of product to be packed, and after closing said container with its contents is subjected to a heat treatment, wherein the wall of the package, which is not resistant to substantial overpressures, is provided before the heat treatment with at least one pressure balancing opening, which is hermetically sealed after the heat treatment, before germs can penetrate into the package, by means of a heat meltable polymer compound. This means that products in a non-pressure-resistant package or container which is made, for example, fully or partially of a thin-walled plastic, can be packed and subjected to a heat treatment in the package or container without internal pressure increase.

According to the invention, the pressure balancing opening is preferably closed by means of a heat meltable polymer compound known as a hot melt, which can be applied to the package or container at the pressure balancing opening either before or after the heat treatment.

It is advantageous to apply a hot melt with a melting point which is lower than the heat treatment temperature and to melt the hot melt by means of the heat treatment. The pressure balancing opening or openings are expediently smaller than 1 mm, preferably smaller than 0.5 mm.

The invention also relates to a closed container with packed products, particularly foods, which container with packed products has been subjected to a heat treatment after packaging, wherein the wall of the closed container which is not resistant to substantial overpressures, comprised a pressure balancing opening during the heat treatment, said pressure balancing opening being sealed by a hermetic seal formed by a heat meltable polymer compound.

It is clear that the hot melt must have a melting point which is lower than the melting point of the materials of the package or container to which the hot melt is applied.

The package or container consists, of course, of materials which are resistant to the temperatures occurring during the heat treatment. Preferred materials are plastics or glass.

Advantageously the material of the container is chosen from glass and plastics and the container is closed with a cover chosen from plastics and plastic coated covers, which materials are easily accessible. Plastic coated covers are preferably plastic coated metal foil such as aluminium foil.

If the container is closed with a cover supporting a meltable plastic coating (such as Surlyn ®, Dupont) adhering to the container, the melting point of said heat meltable polymer compound is lower than the melting of said plastic coating.

In order to allow the use of heat meltable polymers in the form of hot melts having a low viscosity, preferably a rounded rigid body having a plasticizing temperature above the highest temperature of the heat treatment and having a size greater than the size of the pressure balancing opening is accommodated in said heat meltable polymer compound, said rigid body closing a pressure balancing opening.

In a preferred embodiment one of the following inventive features are applied:

(a) the meltable polymer compound is a hot melt being applied to the package in liquid phase at the pressure balancing opening after the heat treatment and is then caused to solidify, sealing said pressure balancing opening;

(b) the meltable polymer compound is a hot melt being applied to the wall of the package at the pressure balancing opening before the heat treatment, the hot melt is caused to melt and then to solidify again thereby sealing said pressure balancing opening, and if the hot melt has a melting point being higher than the heat treatment temperature it is caused to melt after the heat treatment if the hot melt has a melting point being lower than the heat treatment temperature it is caused to melt by the heat treatment;

(c) the meltable polymer compound is a hot melt being applied as a layer to part of the wall of thepackage;

(d) the meltable polymer compound isahot melt being applied in the form of a drop preferably in a recess in a wall of the package;

(e) the pressure balancing opening opens in a perforation in the meltable polymer compound;

(f) the pressure balancing opening or openings are smaller than 1 mm, preferably smaller than 0.5 mm.

The interior of the closed container will be under subatmospheric pressure after sterilisation or pasteurisation.

The heat treatments used above are pasteurisation and sterilisations, but the invention is not restricted to these and can also be used in, for example, the baking of products such as cake or bread in the package.

BRIEF DESCRIPTION OF THE DRAWINGS

FIGS. 3a–3d are various embodiments of a detail of FIG. 2, and

FIG. 4 is a part of a cover of a glass container provided with an opening closed by means of a meltable polymer compound comprising a ball of glass closing an opening in the cover.

DESCRIPTION OF THE PREFERRED EMBODIMENTS

Figure 1:
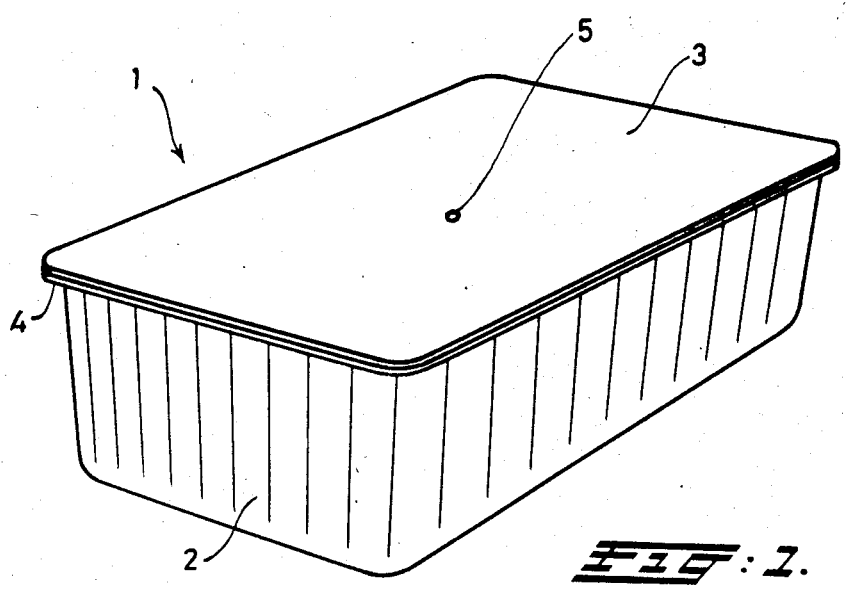
FIG. 1 is a package according to the invention in perspective.

FIG. 1 shows a pack 1, comprising a container 2 of, for example, thin-walled plastics, provided with a plastic cover 3 in the form of a covering plastic foil sealing hermetically over the rim 4 of the container 2.

Figure 2:
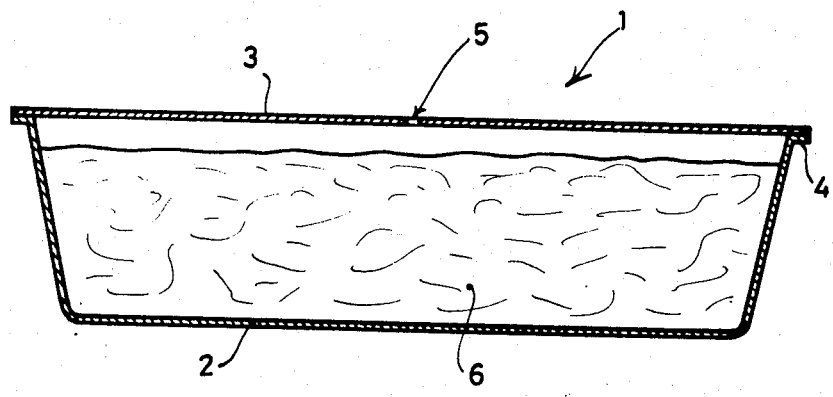
FIG. 2 is a cross section of a package with contents of the invention.

The cover is provided with at least one pressure balancing opening or venthole 5. In FIG. 2 the package filled with a specific quantity of product 6 to be packed and to be pasteurized is shown in cross section.

When this package is subjected to heat treatment, such as sterilisation or pasteurisation, the temperature increase will cause the pressure in the pack to increase, but this pressure can be balanced via the pressure balancing opening or vent hole 5.

After the heat treatment, the pressure balancing opening or vent hole 5 must be hermetically sealed before bacteria or germs are able to penetrate into the package.

The pressure balancing opening or vent hole 5 is sealed by means of a meltable polymer compound or hot melt. According to a particular embodiment of the process, the hot melt is applied to the package in liquid phase at the opening 5 after the heat treatment. The hot melt as used has such a melting point that it closes the opening 5 immediately after it is applied.

According to another embodiment, the hot melt is applied to the package at the pressure balancing opening or vent hole already before the heat treatment. The advantage is that the adhesion of the hot melt 7 to the package is not adversely affected by the heat treatment, during which the package often becomes damp at its outerside.

FIG. 3 shows a number of possibilities for applying the hot melt to the package.

In the embodiment according to FIG. 3a, the hot melt 7 is in the form of a solidified drop sealing off the interior of the package. FIG. 3b shows an embodiment in which the hot melt 7 is provided with a perforation 9 before the heat treatment. According to FIG. 3d, the hot melt is in the form of a layer 8 on the lid 3.

When a hot melt with a melting point being higher than the heat treatment temperature is used the drop 7 or the layer 8 has to be provided with a perforation 9 at the pressure balancing opening 5 before the heat treatment, as indicated in FIGS. 3b, 3c and 3d. In that case the hot melt is melted temporarily after the heat treatment, for example by means of a heating element, to seal the opening 5.

If one uses a hot melt having a melting point being lower than the heat treatment temperature, it is advisable also to provide the hot melt with a perforation 9 at the pressure balancing opening 5 before the heat treatment. During the heat treatment the hot melt becomes liquid, so that gases can escape from the container 2 closed by cover 3 through the liquid hot melt. In order to prevent the hot melt from flowing from the area surrounding the pressure balancing opening 5, the wall of the package in this case the plastic cover 3, is preferably provided at the opening 5 with a recess 10, in which the hot melt is accommodated. When the temperature drops after the heat treatment and no further gas is escaping from the package the walls of the aperture 9 in the still liquid hot melt flow together, thereby hermetically sealing said opening 5. The hot melt 7 then solidifies totally when the temperature drops further so that after cooling a subatmospheric pressure will exist in the closed pasteurized or steriliized package comprising the container 2 with a cover 3.

In some cases it may be advantageous that a body of material remaining rigid at the highest temperatures during the heat treatment, such as a glass bead 13, is incorporated in the hot melt 7 as shown in FIG. 4. In this particular case the container 2' consists of glass and is closed by an aluminium foil 11 supporting a plastic coating 12 (e.g. of Surlyn ® Dupont). The hot melt 7 with glass bead 13 is accommodated in a recess 10. Such a container is very suitable for manufacturing sterilized packages. Evidently the size of the glass bead 13 should be greater than the size of the opening 5 in the cover. Instead of a glass bead 13 one may also use a body of e.g. a polyamide.

The incorporation of the glass bead 13 allows the use of a hot melt having a lower viscosity without the risk of sucking of the liquid hot melt into the interior of the package.

Moreover, the glass bead 13 provides a higher safety against any undesired opening of said vent hole 5 in the cover 11.

Advantageously the hot melt has a viscosity comprised between 5000 and 15,000 cPs at 125° C. Preferred hot melts consist of EVA's such as Helmitherm 42013 having a melt viscosity of 18500 cPs at 150° C. (determined according to Brookfield) or, Helmitherm 42031 having a melt viscosity of 8750 cPs at 150° C. S 1401 has a viscosity of 91,000 cPs at 160° C.

Other suitable hot melts are Dynapol D812, a polyester hot melt having a melting point of 75° C. and a viscosity of 10,000 cPs at 150° C.

The viscosity of the hot melt as used for closing an opening 5 in the package should meet at least the following requirements:

(a) the hot melt should be water resistant at high temperatures and high pressures;

(b) the hot melt should not be sucked into the package due to an underpressure being formed in the package during cooling after the heat treatment;

(c) during the heat treatment the viscosity of the hot melt should be such that an increase of pressure inside the package is able to equalize.

(d) if the cover for closing the container consists of a plastic coated cover, such as plastic coated aluminium, the melting point of the plastic coating of the cover such as Surlyn should be higher, than the melting point of the hot melt. Such plastic coated covers are advantageously used for closing containers e.g. of glass, which are subjected to sterilization at about 130° C. A suitable cover of this type is an aluminium cover coated with Surlyn ® (Dupont).

EXAMPLE I

The process according to the invention is used for packaging a product in a package comprising a polypropylene container 2 which is closed after filling with apple-sauce by means of a cover 3, also made of polypropylene. The cover is provided with a pressure balancing opening or vent hole 5 approximately 0.4 mm in diameter. At this opening 5 a drop of hot melt 7 with a perforation 9 is provided. The hot melt consists of ethylene vinyl acetate presenting a low viscosity and a melting point of 55° C. (Helmitherm 42031). The package with its contents is heated in a heating tunnel with water to a temperature of 95° C. The pressure increases produced in the package by this temperature increase are balanced by means of the pressure balancing opening 5 and the perforation 9. The hot melt becomes also liquid through the increase in temperature. After the heat treatment the walls of the perforation 9 in the molten hot melt flow together and the perforation 9 is sealed. Though the hot melt is is still fairly viscous at a temperature of about 90° C. the molten hot melt cannot flow into the package through the fairly small pressure balancing opening 5.

EXAMPLE II

A polyester container 2 is filled with the rye bread and then closed by means of a polyester cover 3. The package is also provided with a pressure balancing opening or vent hole 5 and provided on the opening is a drop of hot melt 7, consisting of a polyamide with a melting point of 110° C. (Helmitherm 40026). During baking at a temperature of approximately 180° C., gas can escape through the opening or vent hole and a perforation 9 in the hot melt. After baking, the opening or vent hole 5 is sealed by means of the hot melt 7 as the walls of the perforation 9 melt together when no further gases escape from the interior of the package.

The choice of melting point for the hot melt is therefore determined, on the one hand, by the temperature at which the heat treatment takes place and, on the other, by the way in which the hot melt is caused to melt, for example by means of a heating element or through the heat treatment.

EXAMPLE III

The process according to example I is repeated but the container 2' is now a glass container being covered by aluminium foil 11 supporting a Surlyn ® (Dupont) coating sealingly engaging the upper edge of the glass container 2'. The glass container with food products is sterilized at 130° C.; gases are able to escape through vent hole 5 and through the liquid hotmelt 7 being accommodated before starting the sterilization.

Preferably a glass bead 13 is used for an additional closing of vent hole 5.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A process of packaging heat-treated products, particularly foods, comprising the steps of:
   filling a container with a specific quantity of product to be packed;
   closing said container, said closed container having a wall which is not resistant to substantial overpressures and is provided with at least one pressure balancing vent opening, said vent opening being closed by a solidified drop of a heat meltable polymer adhering to the surface of the container;
   subjecting said container with its contents to a heat treatment, the size of the vent opening and the melting point and viscosity of the heat meltable polymer having been selected in such a way that said polymer is melted during said heat treatement but does not substantially flow into the container during heat treatment and wherein gaseous products formed in the container during said heat treatment are able to escape through said vent hole and said meltable polymer, and;
   cooling the container after said heat treatment thereby solidifying said melted polymer and hermetically sealing sid balancing vent opening by means of said heat-meltable polymer without substantially sucking the drop of heat meltable polymer into the interior of the container, wherein said polymer has a melting point lower than the temperature of the heat treatment.

2. A process according to claim 1, wherein the pressure balancing vent opening is smaller than 1 mm, preferably smaller than 0.5 mm.

3. A process according to claim 1, wherein the pressure balancing opening opens in a perforation in the heat meltable polymer to facilitate escape of gases from the container during the heat treatment.

4. A process according to claim 1 wherein the heat meltable polymer has a viscosity comprised between 5000 cPs at 125° C. and less than 91000 cPs at 160° C.

5. A process of packaging heat-treated products, particularly foods, comprising the steps of:
   filling a container with a specific quantity of product to be packed;
   closing said container, said closed container having a wall which is not resistant to substantial overpressures;
   providing said container with at least one pressure balancing vent opening;
   closing said vent opening by a solidified drop of heat meltable polymer adhering to the surface of the container;
   subjecting said container with its contents to a heat treatment, the size of the vent opening and the melting point and viscosity of the heat meltable polymer having been selected in such a way that said polymer is melted during said heat treatment but does not substantially flow into the container during heat treatment and wherein gaseous products formed in the container during said heat treatment are able to escape through said vent hole and said meltable polymer, and;
   cooling the container after said heat treatment thereby solidifying said melted polymer and heretically sealing said balancing vent opening by means of said heat meltable polymer without substantially sucking the drop of heat meltable polymer into the interior of the container, wherein said polymer has a melting point lower than the temperature of the heat treatment.

6. A process according to claim 5, wherein the pressure balancing vent opening is smaller than 1 mm, prefereably smaller than 0.5 mm.

7. A procss according to claim 5, wherein the pressure balancing opening opens in a perforation in the heat meltable polymer to facilitate escape of gases from the container during heat treatment.

8. A process according to claim 5, wherein the heat meltable polymer has a viscosity comprised between 5000 cPs at 125° C. and less than 91000 cPS at 160° C.

* * * * *